(12) United States Patent
Bray

(10) Patent No.: US 8,943,466 B2
(45) Date of Patent: Jan. 27, 2015

(54) DATA ELEMENTS WITH SELECTABLE SIGNAL/PARAMETER BEHAVIOR CONTROL

(75) Inventor: Steven Christopher Bray, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 2050 days.

(21) Appl. No.: 11/524,190

(22) Filed: Sep. 21, 2006

(65) Prior Publication Data

US 2008/0127058 A1    May 29, 2008

Related U.S. Application Data

(60) Provisional application No. 60/839,234, filed on Aug. 22, 2006.

(51) Int. Cl.
    *G06F 9/44*       (2006.01)
(52) U.S. Cl.
    CPC ..................................... *G06F 8/34* (2013.01)
    USPC ........................................................ 717/106
(58) Field of Classification Search
    None
    See application file for complete search history.

(56) References Cited

U.S. PATENT DOCUMENTS

| 4,816,999 | A | * | 3/1989 | Berman et al. ................... 716/54 |
| 5,301,301 | A | * | 4/1994 | Kodosky et al. ............... 716/119 |
| 5,661,692 | A | | 8/1997 | Pinkham et al. |
| 5,860,003 | A | | 1/1999 | Eidler et al. |
| 5,881,288 | A | * | 3/1999 | Sumi et al. ..................... 717/125 |
| 6,738,388 | B1 | | 5/2004 | Stevenson et al. |
| 6,988,161 | B2 | | 1/2006 | McConnell et al. |
| 7,010,744 | B1 | | 3/2006 | Torgerson |
| 7,024,631 | B1 | * | 4/2006 | Hudson et al. ................. 715/763 |
| 7,085,702 | B1 | | 8/2006 | Hwang et al. |
| 2003/0016206 | A1 | | 1/2003 | Taitel |
| 2003/0023576 | A1 | * | 1/2003 | Gilson .............................. 707/1 |
| 2003/0051223 | A1 | * | 3/2003 | Wheeler et al. .................. 716/18 |
| 2004/0044990 | A1 | | 3/2004 | Schloegel et al. |
| 2004/0230946 | A1 | * | 11/2004 | Makowski et al. ........... 717/109 |
| 2005/0039160 | A1 | | 2/2005 | Santori et al. |
| 2005/0039162 | A1 | | 2/2005 | Cifra |
| 2005/0039170 | A1 | * | 2/2005 | Cifra et al. .................... 717/125 |
| 2005/0091602 | A1 | | 4/2005 | Ramamoorthy et al. |
| 2005/0107998 | A1 | | 5/2005 | McLernon et al. |
| 2005/0278162 | A1 | | 12/2005 | Ciolfi et al. |
| 2006/0041859 | A1 | | 2/2006 | Vrancic et al. |

(Continued)

OTHER PUBLICATIONS

Conway et al. "A Software Engineering Approach to LabView", May 2003, Prentice Hall, Section 8.2.*

(Continued)

*Primary Examiner* — Jue Louie
(74) *Attorney, Agent, or Firm* — Finnegan, Henderson, Farabow, Garrett & Dunner LLP

(57) ABSTRACT

A method for designing software in a software design includes providing, in a software design tool, a software block including one or more data elements of one of signal-type or parameter-type. At least one of the one or more data elements is designated as one of a port or a property. If the at least one data element is designated as a property, a value associated with the property is established. Alternatively, if the at least one data element is designated as a port, a connection with one or more software blocks associated with the software design environment is established. The method also includes generating at least a portion of software code associated with the software block based on the designation of the at least one data element.

20 Claims, 5 Drawing Sheets

(56) References Cited

U.S. PATENT DOCUMENTS

| | | |
|---|---|---|
| 2006/0053407 A1 | 3/2006 | Kodosky et al. |
| 2006/0064294 A1 | 3/2006 | Clark |
| 2006/0064669 A1 | 3/2006 | Ogilvie et al. |
| 2006/0064670 A1 | 3/2006 | Linebarger et al. |
| 2006/0074290 A1 | 4/2006 | Chen et al. |
| 2006/0143579 A1 | 6/2006 | Torgerson |

OTHER PUBLICATIONS

Steven Christopher Bray, Copending U.S. Appl. No. 11/894,951, filed Aug. 22, 2007.

* cited by examiner

DATA ELEMENTS WITH SELECTABLE SIGNAL/PARAMETER BEHAVIOR CONTROL

This application claims priority to and the benefit of the filing date of U.S. Provisional Patent Application No. 60/839,234, filed Aug. 22, 2006, which is herein incorporated by reference in its entirety.

TECHNICAL FIELD

The present disclosure relates generally to software code development using software design tools and, more specifically, to a system and method for embedded software design using data elements with selectable signal/parameter behavior control.

BACKGROUND

Embedded systems are used in a variety of today's electromechanical systems. These systems are often configured to perform one or more specialized tasks associated with the system in which they are deployed. In many cases, these embedded systems perform centralized operational and control functions associated with a larger system, functioning as the "brain" of the system. For example, an embedded system may include an electronic control unit (ECU) programmed to monitor and/or control particular aspects and/or operations associated with the device in which it operates. Embedded systems are often highly specialized and critical to the performance of the systems in which they are implemented.

In order to minimize manufacturing and repair costs, generic embedded systems were developed that are compatible with a variety of different hardware. Once installed in a device, these generic systems may be customized using functional, processor-executable software loaded into a memory device associated with the system. This functional software may contain instructions for controlling virtually every operation associated with the device. By customizing operations of each embedded system at the software level, the same hardware system may be employed in variety of applications, allowing for mass-production of the generic hardware. Further, because the functionality of the system is defined almost exclusively in software, updates, modifications, and upgrades may be made to the system without necessitating replacement of the system hardware, thereby reducing repair and upgrade costs.

Because software for embedded systems may define virtually all functional aspects associated with the system, the design of software for these systems may be complicated, time intensive, and require highly specialized knowledge of software code. For example, a block of software that defines a simple dataflow function related to one component associated with a larger system may comprise several hundred lines of code. This block may be combined with other blocks of code to define operations associated with an entire system, from monitoring and control operations to data transmission and warning system operations. In all, software associated with an engine controller may comprise hundreds of thousands of lines of code, including hundreds of individual software blocks.

In an attempt to simplify the software design for embedded systems, some automated design tools have been developed. These design tools typically allow users to generate software by providing a design environment where data models corresponding to small blocks of software code may be graphically assembled to create a functional "map" of a desired software application. These small blocks (referred herein as data elements) may be interconnected with other data elements to form a software block, which may define higher level functions defined by the one or more data elements included in the block. This software block may be executed by a software design tool to generate software code associated with the graphical design. These software blocks may be stored and reused in future designs.

Each data element may be represented as either an variant data element (referred to as a signal) or an invariant data element (referred to as a parameter). In a typical design environment signals may be routed and/or interconnected with other data elements. Parameters, on the other hand, are typically manually defined for a particular data element and are generally not configured to be routed or interconnected. As a result, if the same parameter is being used in multiple instances, users may be required to manually define the parameter in each instance. Furthermore, as a practical matter, because signals are generally interconnected in a graphical design tool using lines (or wire) representations while parameters may only include parameter names or value designations, dataflow tracking and identification may be significantly easier for signal-type data elements.

In order to capitalize on the design flexibility and ease of use of signal-type data elements, many software design tools define all data elements, variant and invariant alike, as signals. However, implementing software functions associated with signal data elements (i.e., variable data elements) in hardware may have several disadvantages. For example, because of the variant nature of signals (i.e., the ability to take on multiple values or functions, depending on certain impulses that they receive), writable memory and additional processing capacity may be required, as operations on variant data may be substantially more complicated than operations on invariant (i.e., constant) data. As a result, complex and expensive hardware may be required to accommodate the writable memory and increased processing capabilities that may be necessitated by signal-type data element designation. Accordingly, it may be advantageous to provide certain signal-type design capabilities without necessarily increasing the complexity or expense of the embedded system hardware. Thus, to maximize design flexibility, while minimizing hardware costs associated with the software implementation, a software design tool with reusable data elements that enables users to take advantage of both signal-type and parameter-type data treatment, may be required.

At least one system has been developed that allows users to select certain configurations associated with software design blocks. For example, U.S. Patent Publication No. 2005/0278162 ("the '162 publication") to Ciolfi et al. provides a software design environment that includes "variant" software configuration blocks. These blocks allow users to switch between various input sources, output destinations, and dataflow paths associated with the system model, which may allow users to analyze multiple software blocks in a single design environment.

Although the system of the '162 publication provides a user configurable software environment, it may be inadequate in certain situations. For example, the system of the '162 publication only allows user users to switch between multiple input and output sources in order to simulate several software models during different iterations of the model. It does not, however, provide a system for designing embedded software using data elements that can be configured as either variant or invariant at any time. As a result, in cases where a user requires a single data element whose variability is configurable at software run-time, users may be required to develop separate data elements, one for supporting variant data and the other for supporting invariant data. In addition to being time consuming, this multiple-design method may be inefficient.

The presently disclosed data elements with interchangeable signal/parameter behavior control is directed toward overcoming one or more of the problems set forth above.

SUMMARY OF THE INVENTION

In accordance with one aspect, the present disclosure is directed toward a method for designing software in a software design environment. The method may include providing, in a software design tool, a software block including one or more data elements of one of signal-type or parameter-type. At least one of the one or more data elements may be designated, independently for each use of the software block, as one of a port or a property. If the at least one data element is designated as a property, a value associated with the property may be established. Alternatively, if the at least one data element is designated as a port, a connection with one or more software blocks associated with the software design environment may be established. The method may also include generating at least a portion of software code associated with the software block based on the designation of the at least one data element.

According to another aspect, the present disclosure is directed toward a computer-readable medium for use on a computer system, the computer readable medium having computer executable instructions for performing a method for designing software in a software design environment. The method may include providing, in a software design tool, a software block including one or more data elements of one of signal-type or parameter-type. At least one of the one or more data elements may be designated, independently for each use of the software block, as one of a port or a property. If the at least one data element is designated as a property, a value associated with the property may be established. Alternatively, if the at least one data element is designated as a port, a connection with one or more software blocks associated with the software design environment may be established. The method may also include generating at least a portion of software code associated with the software block based on the designation of the at least one data element.

In accordance with yet another aspect, the present disclosure is directed toward a software block for use in a software design tool. The software block may include one or more data elements, each data element classified as one of signal-type or parameter-type and designated, by a user of the software design tool for each use of the software block, as one of a port or a property based on the desired characteristics of software code associated with the data element. Each of the one or more data elements may be configured to receive, if the data element is designated as a property, a value associated with the property. Alternatively, if the data element is designated as a port, a connection with one or more software blocks associated with the software design environment may be received. At least a portion of software code associated with the software block may be generated by a software design tool based on the designation of the data element.

DETAILED DESCRIPTION

Figure 1:
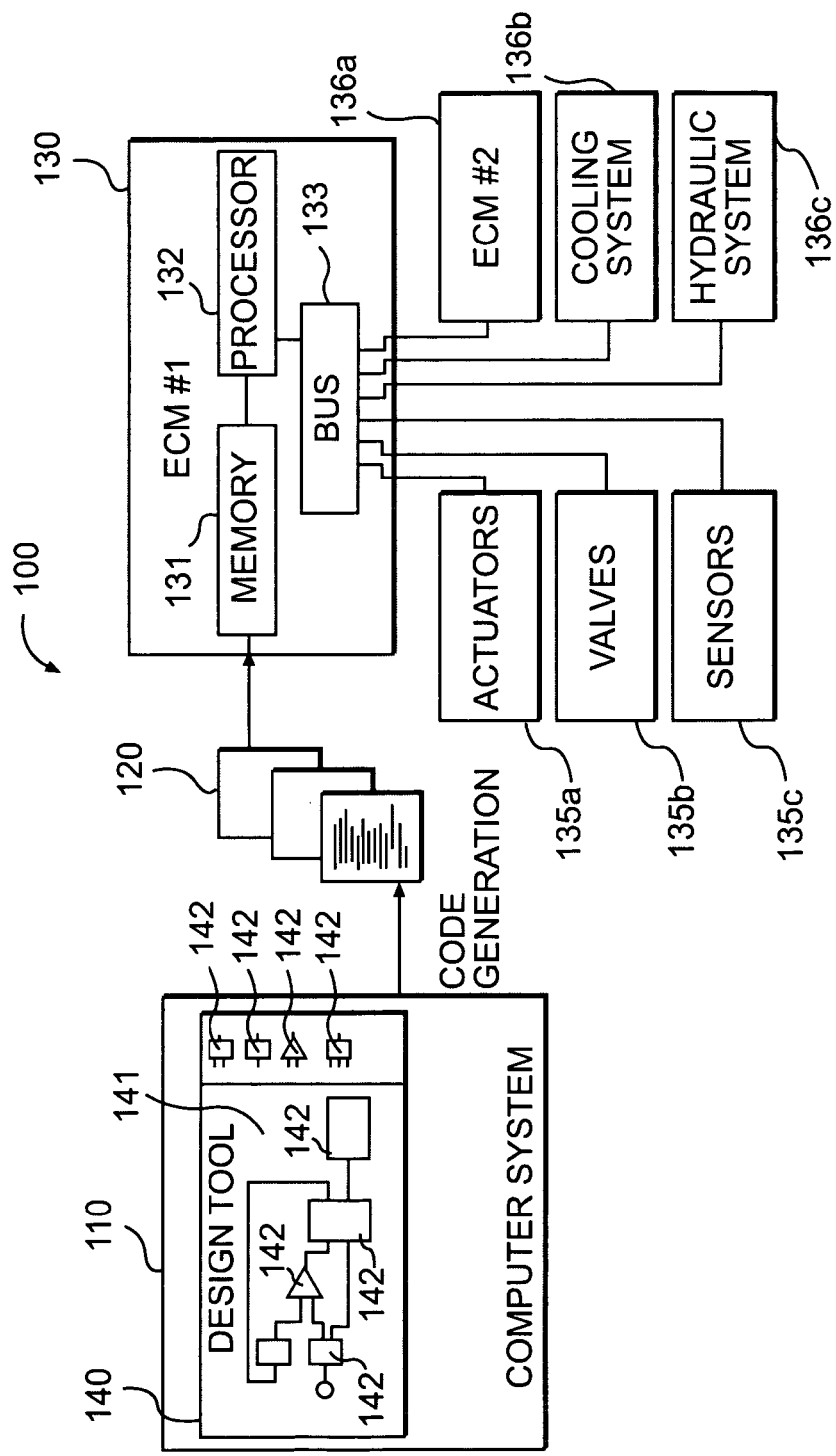
FIG. 1 illustrates an exemplary software design environment in which processes and methods consistent with the disclosed embodiments may be implemented.

FIG. 1 illustrates an exemplary software design environment 100 consistent with the disclosed embodiments. Software design environment 100 may include any environment that enables a user to develop software systems, generate software code associated with the developed software systems, and provide the generated code to an embedded system that executes the code to perform one or more tasks. For example, software design environment 100 may include a computer system 110 for running software design programs to generate a desired software code 120. Software design environment 100 may also include an embedded system 130 communicatively coupled to computer system 110 and configured to receive and store software code 120 generated by computer system 110. It is contemplated that software design environment 100 may include additional, fewer, and/or different components than those listed above. For example, software design environment 100 may include additional computer systems communicatively coupled to one another via a communication network (e.g., the Internet, local area network, etc.) for sharing resources associated with software design environment 100.

Software code 120 may include any type of computer executable instructions for use on and/or by embedded system 130. For example, software code 120 may include control software, operating system software, dataflow system software, or any other type of software. Software code 120 may include instructions for performing various tasks such as, for example, controlling an operation associated with a component or subsystem; directing the flow of information between one or more components or subsystems; collecting, analyzing, monitoring, and/or modifying operations associated with a component; or any other suitable operation associated with embedded system 130.

Embedded system 130 may include any system in which operations of the system are defined substantially by customized programming associated with control software. For example, embedded system 130 may include a generic electronic control unit (ECU), the structure of which may be adapted for use in a variety of machines. Operations associated with embedded system 130 may be defined and/or updated by software code 120, which may be stored on and executed by embedded system 130.

Embedded system 130 may include any system configured to receive software code 120 generated by computer system 110. According to one embodiment, embedded system 130 may be configured to download software code 120 directly from a portable computing device, such as a service tool. This service tool may be configured to receive software code 120 generated by computer system 130 from distribution media or site computer system 110. The system tool may be configured to distribute the software code to embedded system 130 via any wired or wireless communication link. Alternatively and/or additionally, embedded system 130 may be communicatively coupled to the portable computing device (e.g., service tool) that includes a storage device for storing periodically storing software code 120 generated by computer system 110.

Embedded system 130 may include any type of device for controlling, operating, and/or monitoring one or more other devices and/or systems. Embedded system 130 may constitute a control system for a work implement; an electronic control unit (ECU) associated with an engine, transmission, emission system, or any other system associated with a machine; a powertrain control module (PCM) for an on-highway vehicle; a status or health monitoring system; a diagnostic system; and/or any other system for monitoring, controlling, and/or operating a component or subsystem. Embedded system 130 may include a memory 131 for storing and accessing software code 120, a processor 132 for executing software code 120, and a communication bus 133 for providing an command interface with components and/or subsystems associated with embedded system 130.

According to one embodiment, embedded system 130 may embody an ECU associated with a machine (not shown). Embedded system 130 may be communicatively coupled, via communication bus 133, to one or more components 135a-c (e.g., actuators, valves, levers, sensors, etc.) and/or subsystems 136a-c (e.g., other ECMs, controllers, hydraulic system, sooling system, etc.) associated with the machine. Embedded system 130 may be configured to transmit and receive commands for monitoring, controlling, and/or otherwise operating each of components 135a-c and/or subsystems 136a-c, as defined in software code 120 executed by processor 132.

Computer system 110 may include one or more computer programs that, when executed, aid in the development of software code 120 for use by embedded system 130. For example, computer system 110 may include a software design tool 140 for assembling, analyzing, testing, compiling, debugging, and/or generating software code 120 for use by embedded system 130. Software design tool 140 associated with computer system 110 may include, for example, a design window 141 for arranging one or more software blocks 142 to create a desired software model or functional representation of embedded system 130. Computer system 110 may execute the computer programs when prompted by a user associated with computer system 110.

Figure 2:
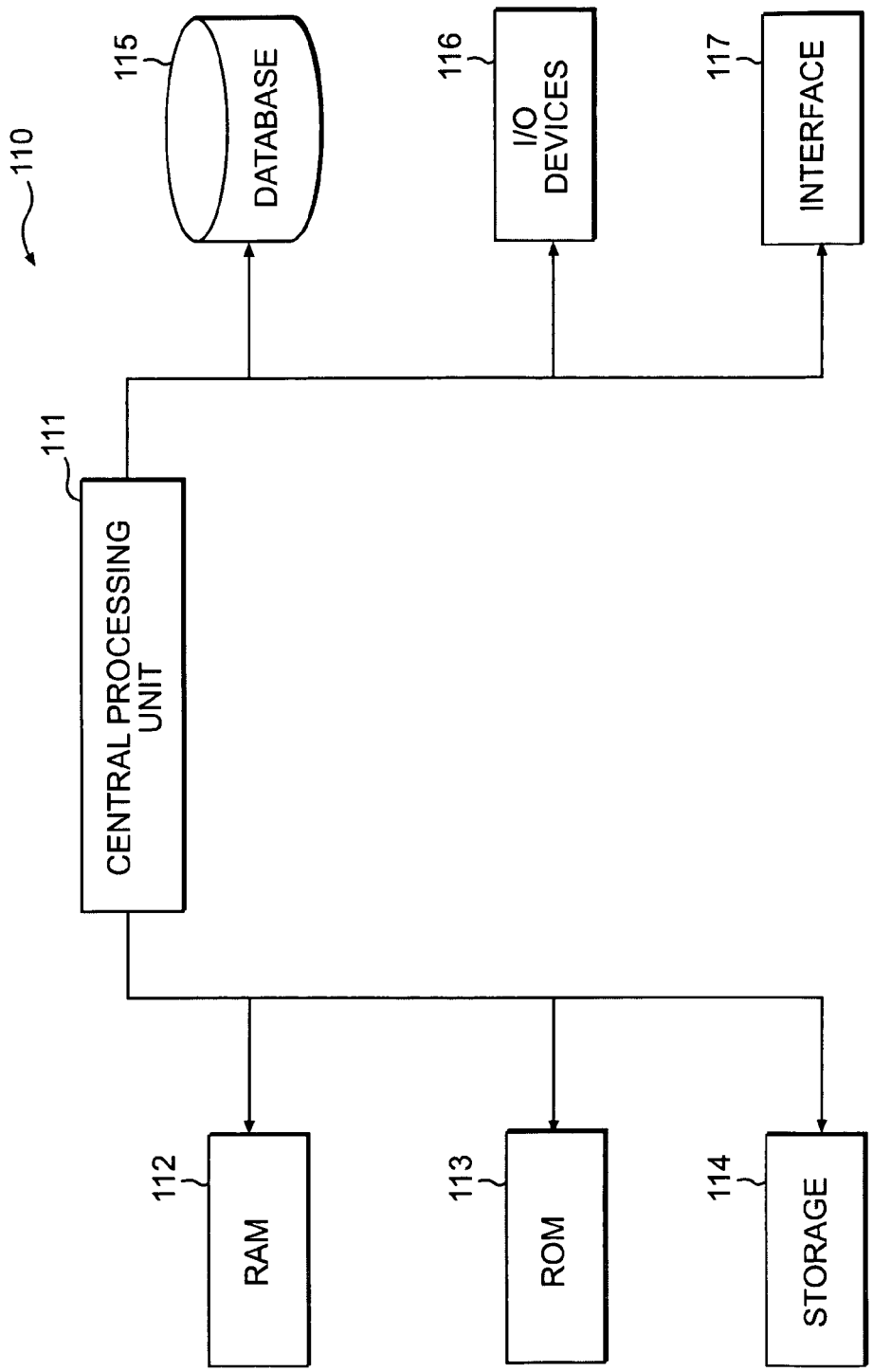
FIG. 2 illustrates an exemplary computer system for use with the software design environment of FIG. 1.

Computer system 110 may include any type or processor-based system on which processes and methods consistent with the disclosed embodiments may be implemented. For example, as illustrated in FIG. 2, computer system 110 may include one or more hardware and/or software components configured to execute software programs, such as software design tool 140. For example, computer system 110 may include one or more hardware components such as, for example, a central processing unit (CPU) 111, a random access memory (RAM) module 112, a read-only memory (ROM) module 113, a storage 114, a database 115, one or more input/output (I/O) devices 116, and an interface 117. Alternatively and/or additionally, computer system 110 may include one or more software components such as, for example, a computer-readable medium including computer-executable instructions for performing methods consistent with certain disclosed embodiments. It is contemplated that one or more of the hardware components listed above may be implemented using software. For example, storage 114 may include a software partition associated with one or more other hardware components of computer system 110. Computer system 110 may include additional, fewer, and/or different components than those listed above. It is understood that the components listed above are exemplary only and not intended to be limiting.

CPU 111 may include one or more processors, each configured to execute instructions and process data to perform one or more functions associated with computer system 110. As illustrated in FIG. 2, CPU 111 may be communicatively coupled to RAM 112, ROM 113, storage 114, database 115, I/O devices 116, and interface 117. CPU 111 may be configured to execute sequences of computer program instructions to perform various processes, which will be described in detail below. The computer program instructions may be loaded into RAM for execution by CPU 111.

RAM 112 and ROM 113 may each include one or more devices for storing information associated with an operation of computer system 110 and/or CPU 111. For example, ROM 113 may include a memory device configured to access and store information associated with computer system 110, including information for identifying, initializing, and monitoring the operation of one or more components and subsystems of computer system 110. RAM 112 may include a memory device for storing data associated with one or more operations of CPU 111. For example, ROM 113 may load instructions into RAM 112 for execution by CPU 111.

Storage 114 may include any type of mass storage device configured to store information that CPU 111 may need to perform processes consistent with the disclosed embodiments. For example, storage 114 may include one or more magnetic and/or optical disk devices, such as hard drives, CD-ROMs, DVD-ROMs, or any other type of mass media device.

Database 115 may include one or more software and/or hardware components that cooperate to store, organize, sort, filter, and/or arrange data used by computer system 110 and/or CPU 111. For example, database 115 may include a software block library that includes software block templates, previously used software blocks, portions of software code associated with one or more software blocks, and/or previously developed versions of embedded system software. CPU 111 may access the information stored in database 115 to retrieve existing software blocks for use in a software design environment. It is contemplated that database 115 may store additional and/or different information than that listed above.

I/O devices 116 may include one or more components configured to communicate information with a user associated with computer system 110. For example, I/O devices may include a console with an integrated keyboard and mouse to allow a user to input parameters associated with computer system 110. I/O devices 116 may also include a display including a graphical user interface (GUI) for outputting information on a monitor. I/O devices 116 may also include peripheral devices such as, for example, a printer for printing information associated with computer system 110, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 117 may include one or more components configured to transmit and receive data via a communication network, such as the Internet, a local area network, a workstation peer-to-peer network, a direct link network, a wireless network, or any other suitable communication platform. For example, interface 117 may include one or more modulators, demodulators, multiplexers, demultiplexers, network communication devices, wireless devices, antennas, modems, and any other type of device configured to enable data communication via a communication network.

Software design tool 140 may include a software application that enables a user to develop embedded software by constructing a computer-executable representation associated with certain functional aspects of the desired embedded system 130. For example, software design tool 140 may include any computer-based, object-oriented simulation and/or code generation software that allows user to graphically construct certain embedded system diagrams and/or models that represent certain desired functional aspects (e.g., dataflow functions, control and monitoring capabilities, event detection capabilities, etc.) of an embedded system. It is contemplated that these software elements may serve as building blocks for a certain other, higher-level software blocks. For instance, certain data elements that comprise a temperature monitoring function may be collectively and/or separately implemented in an event monitoring subsystem. The event monitoring subsystem may subsequently be implemented in other systems or subsystems such as, for example, in an automatic temperature control system. Additionally, data elements (low-level building blocks), temperature monitoring system (mid-level building block), and/or the event monitoring system (high-level building block) may each be stored for future use in other subsystems associated with the embedded control system (e.g., in other/different machines or machine types, in other control systems, etc.).

Software design tool 140 may execute, analyze, and test the data elements associated with embedded system 130, and generate software code 120 once the desired design parameters have been met. For example, software design tool 140 may enable users to provide the data elements associated with embedded system 130 with sample inputs associated with simulated data signals. Software design tool 140 may initialize the data element with the sample inputs and execute the software in order to simulate operations associated with embedded system 130. Once the desired operation has been realized, software design tool 140 may generate executable software code 120 corresponding to each data element.

Figure 3A:
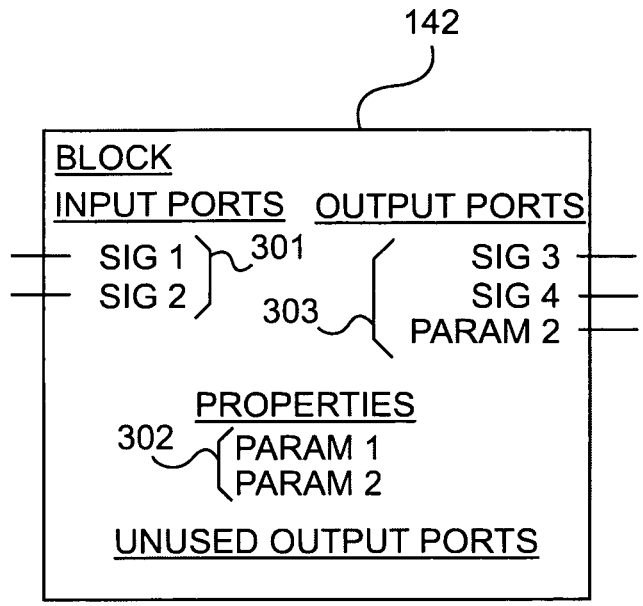
FIG. 3A illustrates an exemplary software block consistent with certain disclosed embodiments.
Figure 3B:
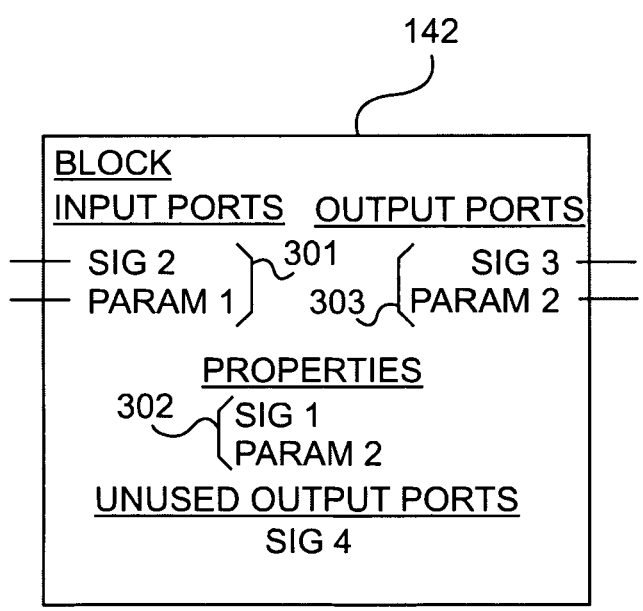
FIG. 3B illustrates another exemplary software block consistent with certain disclosed embodiments.

As illustrated in FIGS. 3A and 3B, each software block 142 may include graphical representations associated with a portion of software code 120 associated with embedded system. These graphical representations may include dataflow characteristics and/or operations associated with the corresponding block of software code represented by the particular software block. Dataflow characteristics, as the term is used herein, refers to any characteristic associated with manner in which data signals are used by the software block. Dataflow characteristics may include gain parameters, port assignment parameters, port definition parameters, internal function parameters (e.g., transfer functions, etc.), data routing parameters, or any other suitable characteristic associated with manner in which software block 142 handles data.

Software blocks 142 may each embody a drag-and-drop data structure associated with software design tool 140. One or more of software blocks 142 may be predefined based on certain frequently used components and/or functions associated with software design tool 140. Alternatively and/or additionally, one or more of software blocks 142 may be created by a user using a software block generator (not shown) associated with software design tool 140.

Software block 142 may include at least one data element 301, 302, 303, 305. These data elements may be classified as signal-type or parameter-type. For purposes of the present disclosure, signal-type data elements represent any variant data elements whose value could vary during operation of the system. For instance, signal-type data elements may include a data element representation of a temperature sensor, whose value may depend on the temperature measured by the sensor. Alternatively, parameter-type data elements refer to any invariant data element whose value can not vary during an operation of the embedded system. Non-limiting examples of parameter-type data elements include internal properties and/or constant values associated with certain systems, such as gain parameters, predetermined benchmark values (e.g., performance thresholds, etc.), operational limits (e.g., engine RPM cutoff value, speed limiters, etc.), or any other type of data element whose value is invariant during operations of a system. For the purposes of the present disclosure, signal and parameter data elements may be composed of any number of data elements with associated values.

According to an exemplary embodiment, the present disclosure allows both signal-type (variant) and parameter-type (invariant) to be treated as signal-type elements for the purpose of associating values of data elements. As such, during data element and/or software block design, both signals and parameters may be graphically routed to one or more other data elements of software blocks within the design environment. By allowing signal-type routing for parameter-type data elements, users may capitalize on the design flexibility and dataflow nature of signals within design environment 100.

Once the block design is completed, users of the block may be permitted to designate a data element as a port (e.g., routed to another data element) or a property (e.g., constant designated value). In one example, a user may designate a particular data element as a port, designating routing to another port to associate the value. This method of associating values is independent of the variant/invariant nature of the data element. It is assumed that these associations will be restricted to preserve the variant/invariant nature of the data elements. For example, an parameter-type data element can be only be associated with the value of another parameter-type data element. Alternately, a signal-type data element can be associated with the value of either a signal-type or parameter-type data element. The realization of association of value is not restricted (e.g. values can flow between separate data elements or associated data elements can be realized as a single data element).

In another example, a user may designate a particular data element as a property, defining a particular use of that data element as a parameter-type (i.e., invariant) element. For example, a user may determine that a particular signal-type data element requires an invariant value (e.g., constant) in a particular use. As such, by defining a particular data element as a property, the software design tool 140 may assign or apply a invariant value to the data element. This avoids the complexity of adding another block to define the value and routing it to the signal-type data element.

For the purposes of the present disclosure, signal-type/parameter-type refer to the variant/invariant nature of data elements and port/property refer to alternate means of associating values with data elements.

According to one embodiment, software blocks 142 may include a plurality of data elements each designated to behave as signal-type (i.e., variant element) or parameter-type (i.e., invariant) that collectively support certain behaviors associated with software blocks 142. For instance, a software block associated with a mechanical valve controller may require at least one input port for receiving a value for a signal-type data element such as, for example, an input signal indicative of a lever position and at least one output port for routing a valve control signal to a valve actuator. Thus, data elements associated with the input port 301 and output port 302 may be signal-type data elements which may both vary based on lever position.

In addition the software block may include an additional signal-type input that controls the gain of the lever (i.e. ratio of value signal to lever signal), a parameter-type limit on maximum gain, and a signal-type output of operating status. The block design may designate that the gain is initially represented as an input port, the limit on maximum gain is initially represented as a property, and the status is initially represented as an output port. In one use of this software block the gain may be designated to be represented as property and assigned a value, the limit on maximum gain may be designated to be represented as a port and routed to a data element that may define the gain for multiple software blocks, and the status may be designated as unused.

FIG. 3A illustrates an exemplary disclosed software block 142, that includes a plurality of input ports, output ports, and block properties. In this exemplary embodiment, each of input ports 301, output ports 302, and block properties 303 each include a plurality of data elements. This configuration, by way of example, may correspond to a software block after an initial design of software block 142. Here, input ports 301 may include a plurality of data elements, which may include signal-type data elements received as variant data signals from one or more other software blocks. It is important to note that the port/property designation described is subject to modification independently for each subsequent use of software block 142, as will be shown in the explanation of FIG. 3B below.

Similarly, block properties 302 may include one or more data elements that are invariant (i.e., do not vary during operations associated with software block 142). As such, values are assigned to these data elements as desired and/or required by the particular requirements of the embedded system for which it is designed. In the example illustrated in FIG. 3A, software block 142 includes two data elements designated as property, named PARAM 1 and PARAM 2.

As illustrated in FIG. 3A, output ports 303 may include a one or more data elements, which can either be associated with either signals or parameters. In this example, two ports are designated as being associated with signal-type data elements and one port is designated as begin associated with a parameter-type data element. Here, the association of PARAM 2 with an output port enables the provision of the invariant value assigned to PARAM 2 to other software blocks within software environment 100, allowing the routing of the value assigned to PARAM 2 to wherever the output port associated with PARAM 2 is connected.

It should be reiterated that, although certain ports and properties corresponding with data elements that are initially designated in this example as associated with signals and parameters, these designations are exemplary only and not intended to be limiting. Furthermore, it is contemplated that although ports and properties may include default configurations, such as those provided in the design example of FIG. 3A, these configuration may be subsequently modified to enable users of software block 142 to customize the particular use of the block. As is illustrated in FIG. 3B, the default configurations established in FIG. 3A will be modified in accordance with the disclosed embodiments.

FIG. 3B illustrates an exemplary use of the software block, initially designed as FIG. 3A. As explained, once a software block is initially designed it may be stored for subsequent retrieval, modification, and customization based on a desired function of the particular software block. For example, according to FIG. 3B, data elements that were originally designated as ports may be changed to block properties. Similarly, data elements that were originally designated as properties may be designated as ports, depending upon the desired functions of each data element associated with the block.

For instance, a data element previously designated as a block property, such as PARAM 1 may subsequently be designated as an input port, indicating that the invariant data value associated with PARAM 1 may be received as a signal from another software block. However, because the value of the port is associated with a parameter-type data element, the software code generated associated with this data element may take advantage of the invariant nature of the data element.

Similarly, a data element previously designated as a port may subsequently be designated as a property for a particular use of software block 142. For example, SIG 1, which was originally designated as an input port in the example associated with FIG. 3A may be designated as an internal block property, which is then functionally brought within software block 142.

Optionally, any unused output ports may be designated as "unused" for instances of the block that may not require was of a particular output port. In this case, an output port may be deactivated without necessitating any structural modification to the block and to avoid potentially erroneous, null, and/or superfluous waste of software code associated with "hanging" ports.

Figure 4:
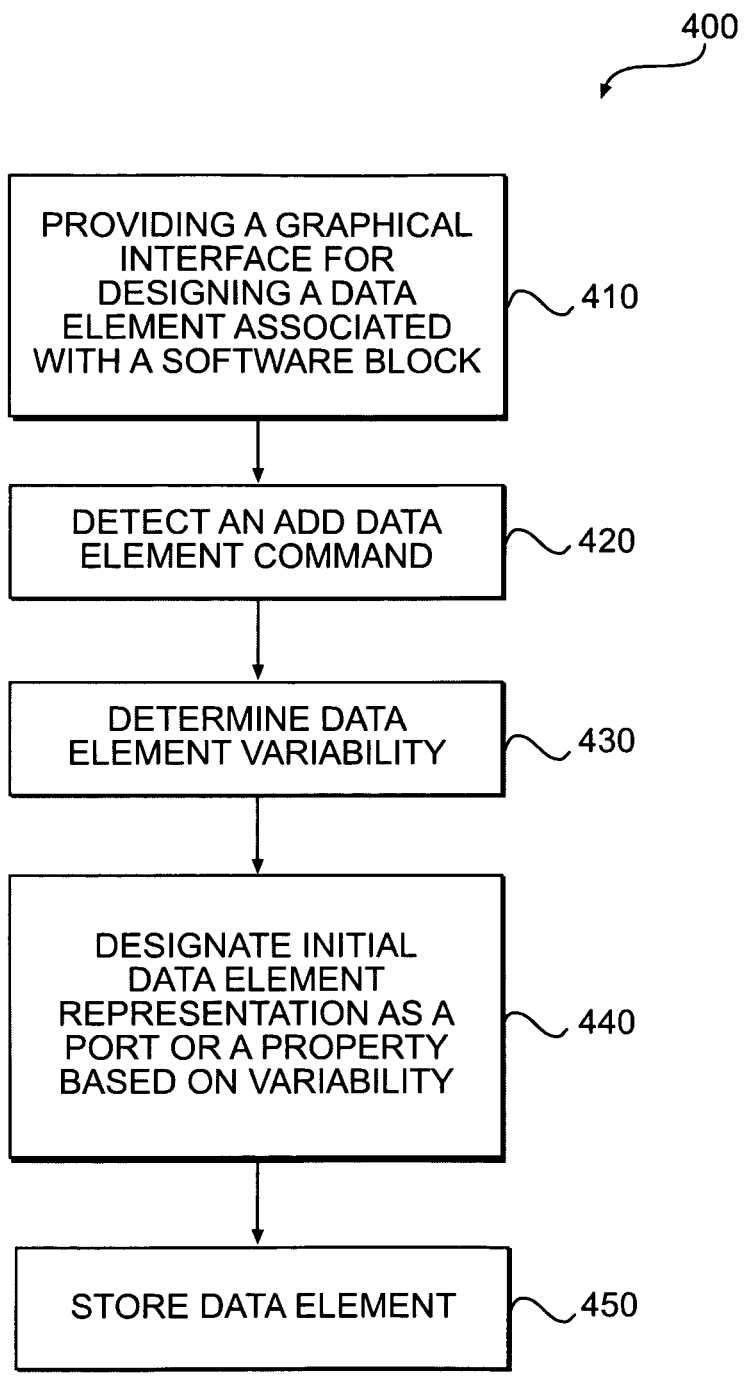
FIG. 4 provides a flowchart depicting an exemplary disclosed method for data element design consistent with certain disclosed embodiments.

Processes and methods consistent with the disclosed embodiment may provide a software design tool comprising configurable software blocks. These configurable software blocks may enable users to automatically modify the dataflow characteristics of portions of embedded software code based on a desired function of the embedded system using user-selectable parameters. FIG. 4 provides a flowchart 400 illustrating an exemplary method for designing a data element in a software design environment. The method may comprise providing a graphical interface for designing a data element associated with a software block (Step 410). For instance, a software design environment 100 may include one or more software programs, such as software design tool 140 that allows users to create, edit, and analyze data elements and generate software code associated with the designed data element.

Software design tool 140 may detect when a user adds a new data element to software design environment 100 (Step 420). Software design tool 140 may include an interactive interface, whereby certain commands and/or actions of a user may be detected by the design tool. This may prompt design tool to respond by providing certain feedback and/or response to the user via the interface. According to one embodiment, software design tool 140 may detect when a user adds or initiates a new data element design.

Once software design tool 140 has detected a new data element request from a user, software design tool 140 may prompt a user (or await user definitions) for one or more definitions and/or configurations associated with the data element. For instance, software design tool 140 may, for example, prompt a user to provide a number of dataflow ports (both input and output), to provide a name for the data element, or to determine and/or select, based on a desired function of the data element, whether the new data element is a variant or invariant data element (Step 430).

Once a user has determined the data element variability, software design tool may designate, based on the variability, the data element as a port element or a property element (Step 440). This initial designation may determine the default data element behavior within the design environment. For example, once defined as a port element, a particular data element may be pre-configured as a port data element in subsequent uses of the data element within software design environment. It is contemplated, however, that the port/property designation of the data element may be modified by a user independently in each use of the data element.

Once the data element has been designated and/or defined, it may be stored in memory for use in subsequent design sessions (Step 450). Software design tool 140 may include a data element database, in which data elements may be stored for future use. For instance, a data element associated with a command module for a hydraulic valve may be stored in the data element database for use in future designs of control systems associated with the same hydraulic valve.

Figure 5:
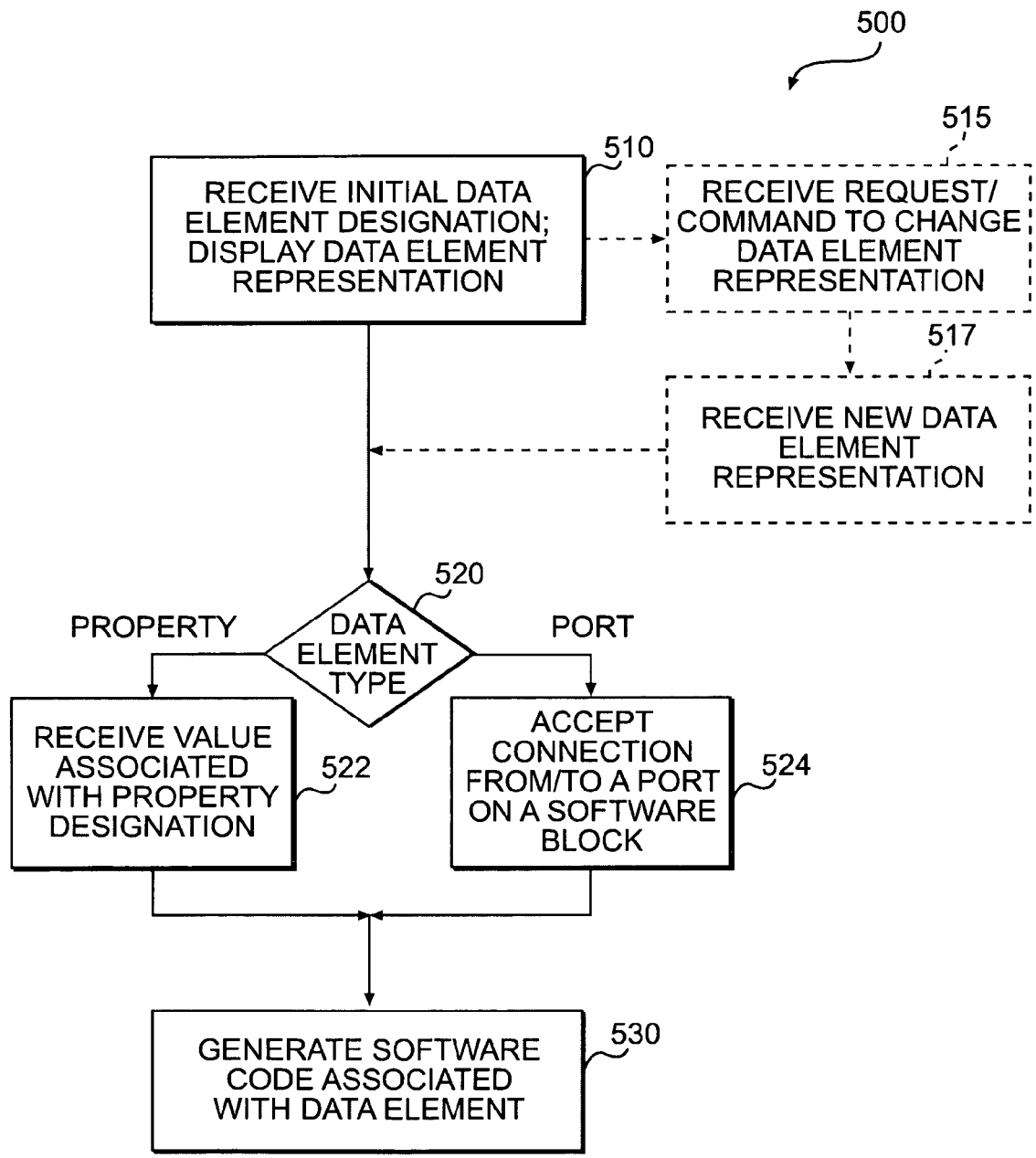
FIG. 5 provides a flowchart depicting an exemplary disclosed method for software code generation using data elements with interchangeable signal/parameter behavior control.

Once one or more data elements have been designed, user of software design tool 140 may access one or more of the data elements and configure the elements to design software blocks 142 corresponding with a desired function of an embedded system. FIG. 5 provides a flowchart 500 depicting an exemplary software block design session involving at least one data element within software design environment 100. The design session initiates when a user of software design tool 140 incorporates one or more data elements into a new software block design. Software design tool 140 may receive an initial data element designation and display the initial data element designation to the user (Step 510). For example, a user may incorporate the data element associated with the hydraulic valve control module into a new software block design. Software design tool 140 may determine that the control module has a default data element designation as a port element. Software design tool 140 may display this designation via a graphical interface to a user, notifying the user of the current designation of the element.

Optionally, software design tool 140 may receive a request from a user to modify the data element designation based on a desired function of the data element within a particular design (Step 515). For instance, software design tool 140 may receive a command from a user change the initial data element designation of the hydraulic system control module from a port element to a property element (indicating that operations of the hydraulic system control module are invariant during operations of the system). In response, software design tool 140 may receive the new data element representation and modify the data element accordingly (Step 517).

Once a software block design has been completed, software design tool may determine a data element type associated with each data element associated with the newly-designed block (Step 520). If a data element is designated as a property element (Step 520: Property) software design tool 140 may receive a pre- or user-defined value associated with the property designation (Step 522). Alternatively, if a data element is designated as a port element (Step 520: Port) software design tool 140 may accept a connection from/to a port associated with the data element with the same and/or different data element or software block within the design environment (Step 524).

Once the data element port/property associations have been determined and defined, software design tool 140 may generate software code associated with the software design (Step 530). For example, software design tool 140 may generate portions of software code associated with an embedded system design based on the configurations, port/property designations, parameter value definitions associated with property-type data element (if any), and/or signal connections between port-type data elements (if any). The generated software code may be subsequently loaded onto a software-configurable hardware system (e.g., an embedded system controller, such as an electronic control unit of a machine).

INDUSTRIAL APPLICABILITY

Although methods and systems consistent with the disclosed embodiments are described in connection with the embedded software design, it is contemplated that the disclosed software design system and associated method may be used to develop software for any type of computer-based system. Specifically, processes consistent with the disclosed embodiments provide a software design system that allows users to take advantage of the graphical portability of signal-type data element treatment during the design phase, without losing the simplicity of implementation of invariant data elements in the embedded software code.

The presently disclosed software design system may have several advantages. For example, software design tool 140 enables users to realize the routing benefits of signals with invariant data elements and to realize the benefits of direct designation of value for variant data elements that are constant in the specific application. As a result, generic software blocks may be developed allowing users to select the dataflow configuration of the software block without requiring separate blocks corresponding to each configuration. This may allow software developers to spend more time customizing a particular software application as opposed to developing different software block configurations corresponding to each different dataflow implementation.

It will be apparent to those skilled in the art that various modifications and variations can be made to the disclosed embedded software design system and associated method. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for designing software for an embedded system in a software design environment, comprising:
providing, in a software design tool, a software block including one or more data elements of one of signal-type or parameter-type, wherein a signal-type data element has a variant data value that varies during operation of the embedded system, and a parameter-type data element has an invariant data value that cannot vary during operation of the embedded system;
designating at least one data element of the one or more data elements as a port in a first use of the software block and designating the same data element as a property in a second use of the software block;
establishing, if the at least one data element is designated as a property, a constant value associated with the property, wherein the at least one data element is not connected to one or more software blocks associated with the software design environment, and the constant value is an invariant data value;
establishing, if the at least one data element is designated as a port, a connection with one or more software blocks associated with the software design environment, wherein variant data values or invariant data values are routed between the at least one data element and the one or more connected software blocks; and
generating at least a portion of software code associated with the software block based on the designation of the at least one data element.

2. The method of claim 1, wherein the at least one data element is one of parameter type that is designated as a port, the method further including:
   connecting the at least one data element to a port on a second software block;
   defining a value associated with the port on the second software block, wherein the at least one data element is assigned the value associated with the port on the second software block; and
   generating at least a portion of software code associated with the software block based on the designation of the at least one data element.

3. The method of claim 1, wherein the at least one data element is of parameter type that is designated as a port, the method further including:
   connecting the at least one data element to a port on a second software block;
   connecting the port on the second software block to at least one other software block;
   defining a value associated with the port on the second software block, wherein the at least one data element and the at least one other software block are each assigned the value associated with the port on the second software block; and
   generating at least a portion of software code associated with the at least one data element and the at least one other software block, each using the value associated with the second software block, based on a respective connection with the second software block.

4. The method of claim 1, wherein the at least one data element is a parameter type data element that is designated as a port, the method further including:
   adapting the software block as a portion of a second software block;
   connecting the at least one data element of the software block to a data element associated with the second software block;
   designating the data element associated with the second software block as a property;
   defining a value for the data element associated with the second software block; and
   generating at least a portion of software code that uses the value for the data element associated with the second software block as a value of the at least one data element associated with the first software block.

5. The method of claim 1, wherein the at least one data element includes a signal type data element.

6. The method of claim 1, wherein the at least one data element includes a parameter type data element.

7. The method of claim 1, wherein designating the at least one data element includes receiving a selection from a user defining the at least one data element as either a port or a property.

8. The method of claim 1, wherein generating at least a portion of software code includes providing the at least a portion of software code to a computer readable medium associated with a controller and wherein the software code is configured to define one or more operations of the controller.

9. A non-transitory computer-readable medium for use on a computer system, the non-transitory computer readable medium having computer executable instructions for performing a method comprising:
   providing, in a software design tool, a software block for designing software for an embedded system, the software block including one or more data elements of one of signal-type or parameter-type, wherein a signal-type data element has a variant data value that varies during operation of the embedded system, and a parameter-type data element has an invariant data value that cannot vary during operation of the embedded system;
   designating at least one data element of the one or more data elements as a port in a first use of the software block and designating the same data element as a property in a second use of the software block;
   establishing, if the at least one data element is designated as a property, a constant value associated with the property, wherein the at least one data element is not connected to one or more software blocks associated with a software design environment, and the constant value is an invariant data value;
   establishing, if the data element is designated as a port, a connection with one or more software blocks associated with the software design environment, wherein variant data values or invariant data values are routed between the at least one data element and the one or more connected software blocks; and
   generating at least a portion of software code associated with the software block based on the designation of the at least one data element.

10. The non-transitory computer-readable medium of claim 9, wherein the at least one data element is designated as a port, the method further including:
    connecting the at least one data element to a port on a second software block;
    defining a value associated with the port on the second software block, wherein the at least one data element is assigned the value associated with the port on the second software block; and
    generating at least a portion of software code associated with the software block based on the designation of the at least one data element.

11. The non-transitory computer-readable medium of claim 9, wherein the second data element is designated as a port, the method further including:
    connecting the at least one data element to a port on a second software block;
    connecting the port on the second software block to at least one other software block;
    defining a value associated with the port on the second software block, wherein the at least one data element and the at least one other software block are each assigned the value associated with the port on the second software block; and
    generating at least a portion of software code associated with the at least one data element and the at least one other software block, each using the value associated with the second software block, based on a respective connection with the second software block.

12. The non-transitory computer-readable medium of claim 9, wherein the at least one data element is a parameter type data element that is designated as a port, the method further including:
    adapting the software block as a portion of a second software block;
    connecting the at least one data element of the software block to a data element associated with the second software block;
    designating the data element associated with the second software block as a property;
    defining a value for the data element associated with the second software block; and
    generating at least a portion of software code that uses the value for the data element associated with the second software block as a value of the at least one data element associated with the software block.

13. The computer-readable medium of claim 9, wherein at least one data element includes a variable data value.

14. The computer-readable medium of claim 9, wherein the at least one data element includes an invariant data value.

15. The non-transitory computer-readable medium of claim 9, wherein designating the at least one data element includes receiving a selection from a user defining the at least one data element as either a port or a property.

16. The non-transitory computer-readable medium of claim 9, wherein generating at least a portion of software code includes providing the at least a portion of software code to a non-transitory computer readable medium associated with a controller and wherein the software code is configured to define one or more operations of the controller.

17. A non-transitory computer-readable storage medium comprising:
a software block for use in a software design tool to design software for an embedded system; the software block comprising one or more data elements, each data element classified as one of signal-type or parameter-type, a signal-type data element having a variant data value that varies during operation of the embedded system and a parameter-type data element having an invariant data value that cannot vary during operation of the embedded system, and each data element designated, by a user of the software design tool, as a port in a first use of the software block and as a property in a second use of the software block based on the desired characteristics of software code associated with the data element, each of the one or more data elements configured to:
receive, if the data element is designated as a property, a constant value associated with the property, wherein the data element is not connected to one or more software blocks associated with a software design environment, and the constant value is an invariant data value;
receive, if the data element is designated as a port, a connection with one or more software blocks associated with the software design environment, wherein variant data values and invariant data values are routed between the data element and the one or more connected software blocks; and
computer executable instructions for generatinq, when executed by the software design tool, at least a portion of software code associated with the software block based on the designation of the one or more data elements.

18. The non-transitory computer-readable storage medium of claim 17, wherein each of the one or more data elements are further configured to;
provide, if the data element is designated as a port, a dataflow path between the data element and one or more software blocks connected to the data element, wherein the dataflow path is configured to enable a flow of information between the data element and the one or more software blocks.

19. The non-transitm computer-readable storage medium of claim 17, wherein each of the one or more data elements are adaptable as a portion of a second software block and wherein a port of the software block is designated as a data element associated with a second software block, the software block configured to:
receive a value for the data element associated with the second software block; and
generate at least a portion of software code that uses the value for the data element associated with the second software block as a value of the one or more data elements associated with the first software block.

20. The non-transitory computer-readable storage medium of claim 17, wherein generating at least a portion of software code includes providing the at least a portion of software code to a non-transitory computer readable medium associated with a controller, and wherein the software code is configured to define one or more operations of the controller.

* * * * *